3,552,752
SHAFT SEAL
Bruno V. Lojkutz, Chicago, Ill., assignor to Gits Bros. Mfg. Co., Chicago, Ill., a corporation of Delaware
Filed Aug. 30, 1968, Ser. No. 756,674
Int. Cl. F16j 9/00, 15/40
U.S. Cl. 277—40     6 Claims

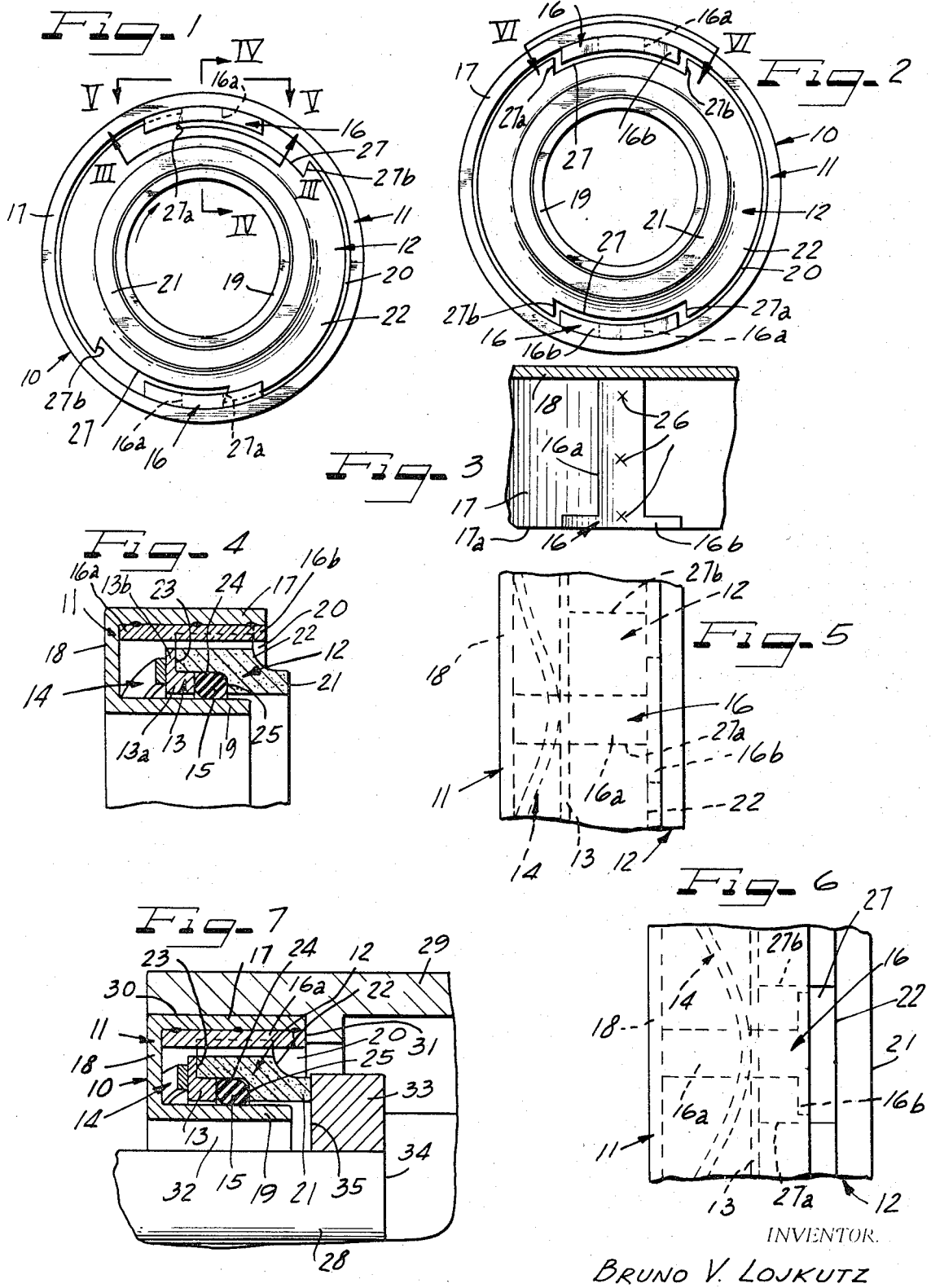

ABSTRACT OF THE DISCLOSURE

A face-type shaft seal having components including a spring urged seal ring selectively retained and removed from an open end casing by a key and slot arrangement including a T-shaped key on the inner surface of the outer peripheral wall of the casing and having a leg coacting with an axially extending peripheral slot in the seal ring which is slidable in the casing and projects through the open end of the casing. This leg holds the seal ring against rotation relative to the casing but accommodates full axial movement of the seal ring in the casing. The T-shaped key has a head adapted to be selectively received in the slot for removal of the seal ring through the open end of the casing or the head may be misaligned from the slot to overlie an end face of the seal ring for retaining the components in the casing. One or more key and slot combinations can be used.

FIELD OF THE INVENTION

The invention is in the field of face-type shaft seals wherein a spring urged seal ring is held against rotation in a casing by a key and slot arrangement which will not interfere with the shifting of the seal ring under spring load in the casing.

DESCRIPTION OF THE PRIOR ART

Key and slot arrangements for face-type shaft seals are known in the art, as for example, in the Gits and Andresen U.S. Pat. 3,278,191, granted Oct. 11, 1966. Such key and slot arrangements, however, do not retain the seal components in the casing and an inturned flange or other retainer must be provided on the casing to maintain the assembly.

SUMMARY OF THE INVENTION

According to this invention, there is provided a key and slot arrangemetn for face-type shaft seals which not only holds the seal ring against rotation in the casing but also selectively retains the seal components in the casing. The seal of this invention is a take-a-part assembly of seal components in a casing which has a free open end for removal of the components. The casing carries one or more T-bars on its inner periphery. The T-bar has an axially extended leg abutting a side wall of a slot in the seal ring to prevent rotation of the ring in the casing. The T also has a cross head in the mouth of the casing to overlie an end wall of the seal ring for retaining the components in the casing. The slot in the seal ring, however, is wide enough to receive the cross head therethorugh when the slot is aligned with the head thereby permitting removal of theseal components from the casing. In operation, in one direction of rotation, the side wall of the slot in the seal ring will engage one edge of the leg while that portion of the head of the T-member on that side of the leg will overlie the end face of the seal ring to prevent removal of the seal components from the casing. In the opposite direction of rotation the opposite side wall of the slot will engage the other edge of the leg while the other half of the head will overlie the end wall of the seal ring. Therefore the arrangement is bi-directional.

It is then an object of this invention to provide a key and slot arrangement for face type shaft seals which holds the seal ring against rotation and selectively retains the joint components in a casing or permits removal of the components.

Another object of this invention is to provide a take-a-part seal with a T-shaped key in a housing component and a wide groove in a housed component coacting with the T-shaped key to retain the seal assembly in the housing when the key and slot are out of alignment and permitting the removal of the seal components from the housing when the key and slot are in alignment.

A further object of this invention is to provide a face type shaft seal with an annular housing of U-shaped cross section adapted to be pressed into a recess in sealed engagement therewith and to freely surround a shaft extending through said recess which housing has an open end freely receiving the seal components and has one or more T-shaped keys secured to the inner periphery of its outer wall coacting with a wide groove in the periphery of an inserted seal component to selectively retain and release the seal components.

Another object of this invention is to provide a face type shaft seal having an annular metal casing of U-shaped cross section with an outer cylindrical peripheral wall free from indentations and adapted to be press fitted into a part to be sealed and a spring loaded seal ring axially shiftable in the housing and adapted to project through the open end of the housing, together with an interfitting key and key way connection between the seal ring and housing including a T-shaped key secured to the inner periphery of the outer casing wall and a wide axial groove in the seal ring adapted to receive the key when aligned therewith and the head of the T adapted to engage an end face of the seal ring when the groove is misaligned from the key.

Other and further objects of this invention will become apparent to those skilled in this art from the following description of the annexed sheet of drawings which illustrates a preferred embodiment of the invention.

BRIEF DESCRIPTION OF THE DRAWINGS

FIG. 1 is a plan view of the open front end of the face type seal ring of this invention showing the components in retained position in the housing.

FIG. 2 is a view similar to FIG. 1 but showing the components in released position in the housing.

FIG. 3 is a fragmentary cross sectional view, with parts omitted, taken along the line III—III of FIG. 1.

FIG. 4 is a cross sectional view taken along the line IV—IV of FIG. 1.

FIG. 5 is a view taken along the line V—V of FIG. 1 and shows underlying parts.

FIG. 6 is a view taken along the line VI—VI of FIG. 2 and showing underlying parts.

FIG. 7 is an enlarged fragmentary cross sectional view similar to FIG. 4 but showing the parts in operating position in a housing and around a shaft.

DESCRIPTION OF THE PREFERRED EMBODIMENT

The shaft assembly 10 of this invention includes an annular metal casing 11, a carbon seal ring 12, a metal carrier or back-up ring 13 a wave spring 14, a resilient O ring seal ring 15 and a pair of metal T-shaped-keys 16 secured on the inner face of the outer circumferential wall of the casing 11.

The housing 11 is U-shaped in cross section and has a cylindrical outer wall 17, a back wall 18 extending radially inward from the wall 17 and a cylindrical inner wall 19 parallel with the wall 17 but terminating axially inward thereof. The U-shaped casing 11 has an open front end or mouth 20 opposite the radial wall 18

The carbon seal ring 12 fits freely in the housing 11 between the outer wall 17 and the inner wall 19 thereof and has a reduced diameter nose 21 projecting from the front face 22 thereof through the open end 20 of the casing. The seal ring has a radial back face 23 with a counterbore 24 extending therefrom to a radial shoulder 25. The backup ring 13 has a collar or flange portion 13a fitting in this counterbore 24 and terminating in spaced relation from the shoulder 25 to coact therewith for forming a groove which receives the O ring 15. The backup ring 13 has a back wall 13b overlying the end face 23 of the seal ring. The wave spring 14 is positioned between this back wall 13b and the back wall 18 of the casing and serves to urge the seal ring 12 toward the open end 20 of the casing.

The T-shaped keys 16 are bonded to the inner face of the wall 17 of the casing 11 as by means of spotwelds 26 or the like bonds which will not destroy the outer cylindrical surface of the casing wall 17.

Each T-shaped key 16 has an axially extending leg 16a and a circumferentially extending head 16b. The head 16b extends circumferentially of the casing wall 17 at or adjacent the free front edge or rim 17a thereof. The leg 16a extends from the central portion of the head 16b to the back wall 18 of the casing.

The carbon seal ring 12 has axially extending peripheral slots 27 coacting with the keys 16. Each slot 27 extends completely across the peripheral wall of the seal ring 12, is wide enough to receive the head 16b of the T therethrough and has end walls or shoulders 27a and 27b along the length thereof for engaging the sides of the axial leg 16a of the T. The axial distance between the end face 22 and the back wall 23 of the carbon ring 12 is less than the length of the key leg 161 so that this leg will always project beyond the open end of the slot 18 and "hang up" caused by the wearing of pockets in the sides of the slot can never occur so that free axial shifting of the seal ring in the casing is ensured.

The back wall 13b of the backup ring terminates radially flush with or short of the bottom of the slot 18 so as not to interfere with free sliding of the assembly in the casing.

The wave spring 14 urges the seal ring toward the open end 20 of the casing so that the nose 21 of the seal ring will project beyond the open mouth of the casing.

As shown in FIGS. 1 and 5, when the seal ring 12 is rotated in a clockwise direction, the side wall or shoulder 27a of the slot 27 will engage the leg 16a of the key 16 and the diamethically opposite corresponding side wall 21a of the opposite slot 27 will similarly engage the leg 16a of the opposite key 16. In this position the front face 22 of the seal ring 12 will abut that portion of the head 16b of the key 16 which is on the same side as the shoulder or slot wall 27a and the seal ring will be held in the casing Conversely, if the seal ring 12 is rotated in a counterclockwise direction, the opposite side walls or shoulders 27b of the slots 27 will engage the opposite sides of the legs 16a of the keys 16 and that portion of the head 16b projecting beyond this engaged side edge of the leg 16a will overlie the end face 22 of the seal ring to retain the same in the housing.

As shown in FIGS. 2 and 6, when the seal ring 12 is positioned so that its slots 27 are aligned with the heads 16b of the T-shaped keys 16, these heads are free to fit in the slots 27 and the seal ring 22 can be removed from the casing. It will be noted that the circumferential extent of the key heads 16b is less than the width of the slots 27 so that these heads 16b will fit freely through the slots.

FIG. 7 illustrates the position of the seal parts when the seal ring 10 of this invention is operating to seal a shaft. As shown in FIG. 7, a shaft 28 is sealed relative to a housing 29 from which it projects by the seal assembly 10 of this invention. The housing 29 has a recess 30 in the end thereof into which the casing 11 is press fitted. The peripheral wall 17 of the casing tightly engages the wall of the recess 30 and since the casing is free from indentations, holes or the like, leakage cannot occur between the casing wall 17 and the housing. A shoulder 31 is provided in the housing at the bottom of the recess 30 and the wall 17 of the casing can be abutted against this shoulder.

The inner peripheral wall 19 of the casing is spaced from the shaft 28 and an operating gap 32 is provided between the shaft and this inner wall. A mating ring 33 composed of steel or other wearing material is carried by the shaft 28 and as shown, is bottomed against a shoulder 34 on the shaft. The ring 33 rotates with the shaft and has a radial face 35 engaging the nose 21 of the seal ring 12. As shown, the spring 14 presses the seal ring 12 so that its nose 21 will project beyond the open mouth of the casing 11 into good riding contact with the radial sealing face 35 of the rotating mating ring 33. It will be noted that in the operating position the seal ring 12 is depressed into the casing 11 away from the crosshead 16b of the T-shaped key 16 and the leg 16b of the key is engaged by either the shoulder 27a or the shoulder 27b of the slot 27 depending upon the direction of rotation of the shaft so that the seal ring is held against rotation.

The gap 32 between the shaft and the inner wall 19 of the casing is sealed by the mating faces of the nose 21 and mating ring 33 and by the O ring 15 which sealingly engages the seal ring 12 and the casing wall 19.

From the above descriptions it will therefore be clear that this invention provides a take-a-part face type shaft seal with key and slot means selectively retaining sealed components in a casing and eliminating the necessity for retaining flanges or the like additional retainers on the seal casing.

I claim as my invention:

1. A face type shaft seal comprising; an annular housing of U-shaped cross section having an open end, seal components in said casing including a seal ring projecting through said open end, said casing and said seal ring having coacting key and slot means holding said seal ring against rotation in the casing while accommodating axial shifting of the seal ring relative to the casing, and said key means having a substantially T-shape with the crossleg of the T positioned adjacent the opening of the housing and the stem of the T extending axially, the said crossleg being substantially wider than the width of the said stem and the said slot having a width equal to or greater than the said crossleg, the said seal ring being rotatable in the said housing to position where one side of the crossleg will overlie portions of the said seal ring for retaining the components in the casing, the said crossleg, stem and slot adapted to be aligned to accommodate removvval of the components from the casing.

2. A face type shaft seal including; an annular metal casing having a cylindrical outer wall adapted to be press fitted into a housing, a radially extending back wall and a cylindrical inner wall extending from said back wall in spaced parallel relation with the outer wall, a carbon seal ring in said casing between said inner and outer walls, means sealing said carbon seal ring to said inner wall while accommodating axial shifting of the carbon seal ring, said carbon seal ring having an open ended axial groove across its periphery, and a T-shaped key secured to the inner surface of the outer casing wall having an axially extending leg in said groove adapted to be engaged by the side walls of the groove and having a head adapted to fit through said groove when aligned therewith and to overlie a face of the seal ring when misaligned from the groove to retain the seal ring in the casing, the said head of the said T-shaped key being substantially wider than the remainder thereof and the said groove having width at least as great as the width of the said head, and spring means between said seal ring and said back wall of the casing urging the seal ring towards said head.

3. A take-a-part shaft seal comprising; an annular housing of U-shaped cross section adapted to be press fitted into a recess in sealed engagement therewith, a seal ring slidably mounted in said housing having a reduced diameter nose portion projecting through the open end of the housing for riding on a mating seal face, spring means in said housing acting on said seal ring to urge said nose outward from the open end of the casing, said seal ring having a pair of diametrically opposite open ended axially extending wide slots across the periphery thereof, T-shaped keys secured to the inner surface of the outer wall of the housing having legs fitting freely in said slots and crossheads overlying the seal ring in the open end of the housing to retain the seal ring in the housing, the crosshead of the said T-shaped key being substantially wider than the said leg of the said key and the said slot having a width greater than the width of the said crosshead, the said crosshead positioned adjacent the open end of the said U-shaped cross section housing with the said leg extending axially thereof, the said seal ring rotatable in the said housing, and said crossheads adapted to fit through said slots when aligned therewith to permit removal of the seal ring from the housing.

4. The seal of claim 1 having a counterbore in the seal ring extending from the back face thereof to a radial shoulder, a backup ring bottomed on the back face of said seal ring having a collar extending into said counterbore and providing a radial shoulder spaced from the radial shoulder of the seal ring to cooperate therewith and with the counterbore for forming a groove opening around the inner periphery of the seal ring, and a resilient O ring seal in said groove sealingly engaging the inner wall of said casing.

5. The shaft seal of claim 2 including a backup ring bottomed on the back face of the seal ring, and a wave spring compressed between the back wall of the casing and the backup ring for urging the seal ring outwardly through the open end of the casing.

6. The seal assembly of claim 1 including a pair of T-shaped keys on the casing and a pair of axially extending slots in the periphery of the seal ring coacting with said keys.

References Cited
UNITED STATES PATENTS

| | | | |
|---|---|---|---|
| 2,857,182 | 10/1958 | Bain et al. | 277—87X |
| 2,996,319 | 8/1961 | Copes | 277—87 |
| 3,245,692 | 4/1966 | Voitik | 277—40 |
| 3,278,191 | 10/1966 | Gits et al. | 277—40 |
| 3,319,968 | 5/1967 | Yost | 277—40 |

SAMUEL ROTHBERG, Primary Examiner

U.S. Cl. X.R.

277—87